United States Patent [19]
Iller

[11] 3,810,266
[45] May 14, 1974

[54] HARDTOP COVER FOR CONVERTIBLE RUNABOUT BOATS
[75] Inventor: John A. Iller, Seattle, Wash.
[73] Assignee: Adabelle E. Iller, Seattle, Wash.; a part interest
[22] Filed: Sept. 28, 1971
[21] Appl. No.: 184,530

[52] U.S. Cl............... 9/1 R, 224/42.1 E, 296/24 R, 296/37 R, 296/137 R
[51] Int. Cl............................................. B63b 29/02
[58] Field of Search.................... 9/1 R; 114/70, 71; 224/42.1 E; 296/1 R, 24 R, 37 R, 137 R

[56] References Cited
UNITED STATES PATENTS
| | | | |
|---|---|---|---|
| 3,438,073 | 4/1969 | Brown | 9/1 R |
| 3,015,519 | 1/1962 | Barenyi | 296/137 R |
| 1,705,592 | 3/1929 | Smith | 9/1 R |
| 2,963,314 | 12/1960 | Richardson | 296/37 R |
| 2,947,277 | 8/1960 | Stevens | 9/1 R |

OTHER PUBLICATIONS
Rudder, March 1960, Advertisement, Page 24

Primary Examiner—Trygve M. Blix
Assistant Examiner—Stephen G. Kunin
Attorney, Agent, or Firm—Clarence A. O'Brien; Harvey B. Jacobson

[57] ABSTRACT

A cover structure including front, rear and opposite side marginal edge portions and for support in generally horizontal elevated position above the cockpit of a boat with the front marginal edge portion of the cover assembly supported from and projecting forwardly of the upper marginal edge portion of the windshield of the associated boat and the side marginal edge portions of the cover assembly disposed above corresponding opposite sidewall portions of the boat. The front marginal edge portion defines a transversely extending front storage compartment opening rearwardly beneath the cover structure and the opposite side marginal edge portions of the cover structure define longitudinally extending opposite side storage compartments.

6 Claims, 8 Drawing Figures

PATENTED MAY 14 1974 3,810,266

John A. Iller
INVENTOR.

BY *Clarence A. O'Brien*
*and Harvey B. Jacobson*
Attorneys

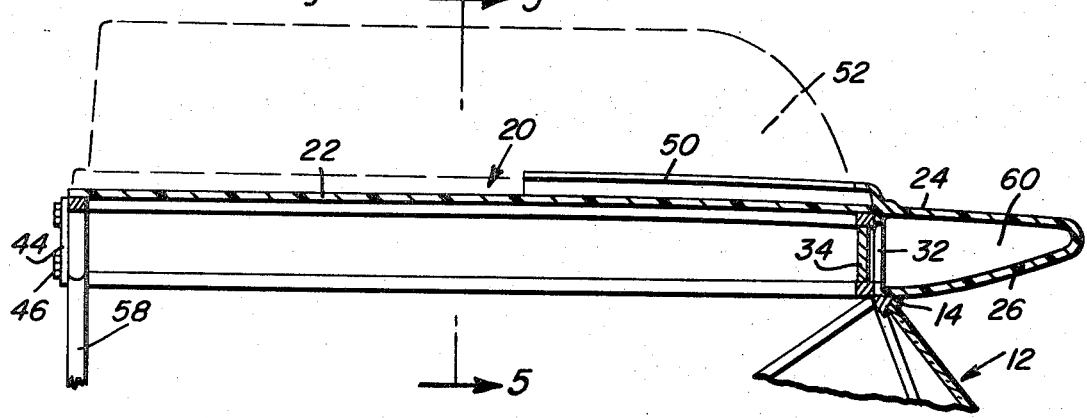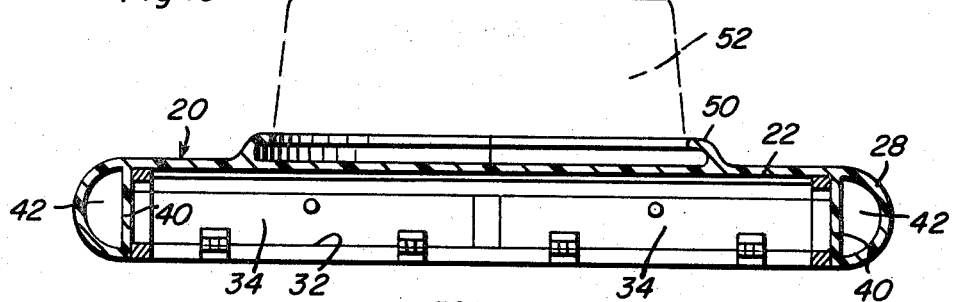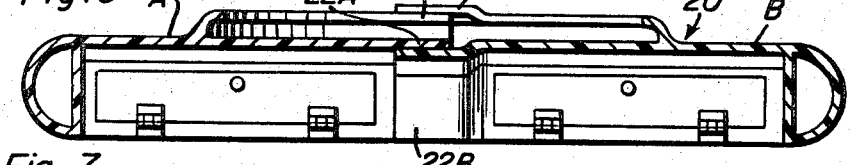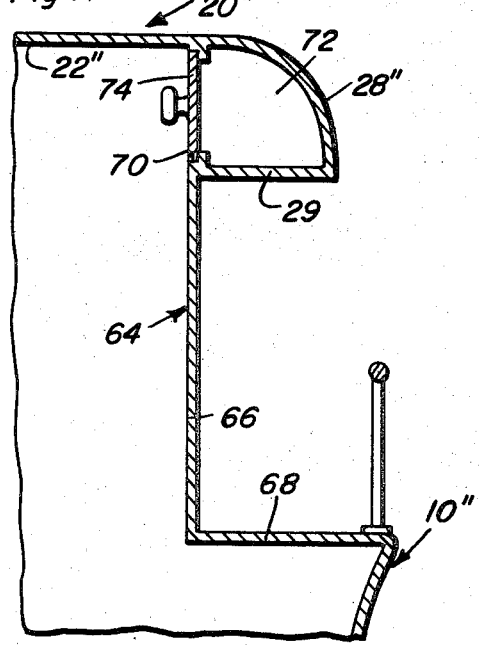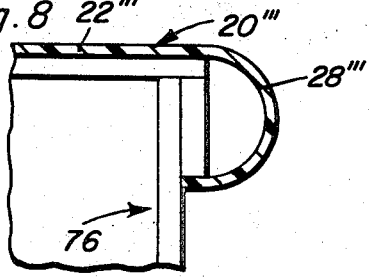
John A. Iller
INVENTOR.

HARDTOP COVER FOR CONVERTIBLE RUNABOUT BOATS

The cover structure of the instant invention has been specifically designed to provide a hardtop cover for the open cockpit of a runabout-type of boat hull. However, the cover structure may also be incorporated into a cockpit enclosing structure, such as a cabin, with the cover structure forming a top wall of the cabin and distinguishing from conventional cabin tops in that it provides additional forward and opposite side storage compartments as well as integral means (to be hereinafter more fully set forth) for supporting a dinghy in inverted position on top of the cover structure.

The forward storage compartment defined by each of the four forms of the invention disclosed and specifically described hereinafter opens rearwardly beneath the cover structure and the opposite side storage compartments of one form of cover structure also open inwardly beneath the latter. However, the opposite side storage compartments of the other forms of the invention open rearwardly at the opposite sides of the rear marginal edge portion of the cover. Further, the cover structure is operatively associated with the windshield of the cockpit of the associated boat in a manner such that substantially all of the forward marginal edge portion of the cover structure defining the forward storage comparment projects forwardly of the upper marginal edge portion of the windshield so as to define a sun shield for the windshield.

The main object of this invention is to provide a hardtop cover for the cockpit area of a motor boat.

Another object of this invention is to provide a hardtop cover in accordance with the preceding object that may be utilized as the cover for an open-type runabout boat or incorporated into the cabin enclosure of a boat provided with an enclosed cockpit area.

A still further object of this invention is to provide a boat hardtop cover provided with structure whereby a dinghy may be supported in stationary inverted position on the top of the cover.

Another important object of this invention is to provide a boat hardtop cover including forward and opposite side storage compartments that will be readily accessible to persons within the cockpit area of the associated boat without those persons having to stoop down in order to gain access to below window area storage compartments.

A final object of this invention to be specifically enumerated herein is to provide a hardtop boat cover in accordance with the preceding objects which will conform to conventional forms of manufacture, be of simple construction and adaptable for use in conjunction with open-type as well as cabin-type boats so as to provide a device that will be economically feasible, long-lasting and readily adaptable for use on many different boats.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 4 is an enlarged fragmentary longitudinal vertical sectional view taken substantially upon the plane passing along the longitudinal centerline of the cover illustrated in FIG. 1;

FIG. 5 is a transverse vertical sectional view taken substantially upon a plane indicated by the section line 5—5 of FIG. 4;

FIG. 6 is a sectional view similar to FIG. 5 but illustrating a modified form of cover for use in conjunction with runabout type boats;

Figure 1:
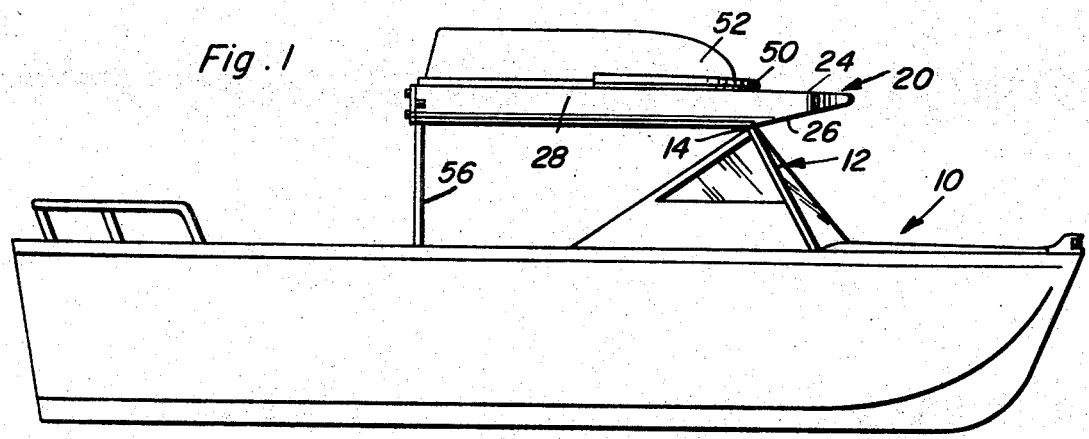
FIG. 1 is a side elevational view of an open-type runabout boat with the hardtop cover of the instant invention operatively associated therewith in lieu of the conventional convertible soft top usually provided on a runabout boat.

FIG. 7 is a fragmentary transverse vertical sectional view illustrating a second modified form of hardtop cover constructed in accordance with the present invention incorporated into the cabin enclosure of a boat provided with a cockpit enclosing cabin; and FIG. 8 is a fragmentary transverse vertical sectional view similar to the upper right-hand portion of FIG. 7 and illustrating a somewhat modified form of hardtop cover incorporated into the cabin structure of a boat.

Referring now more specifically to the drawings, the numeral 10 generally designates an open runabout type of boat including a forward windshield assembly 12 provided with an upper marginal edge portion 14 extending transversely of the boat 10. The boat 10 includes opposite sides 16 and 18 extending longitudinally thereof and a first form of hardtop cover constructed in accordance with the present invention is generally designated by the reference numeral 20.

Figure 2:
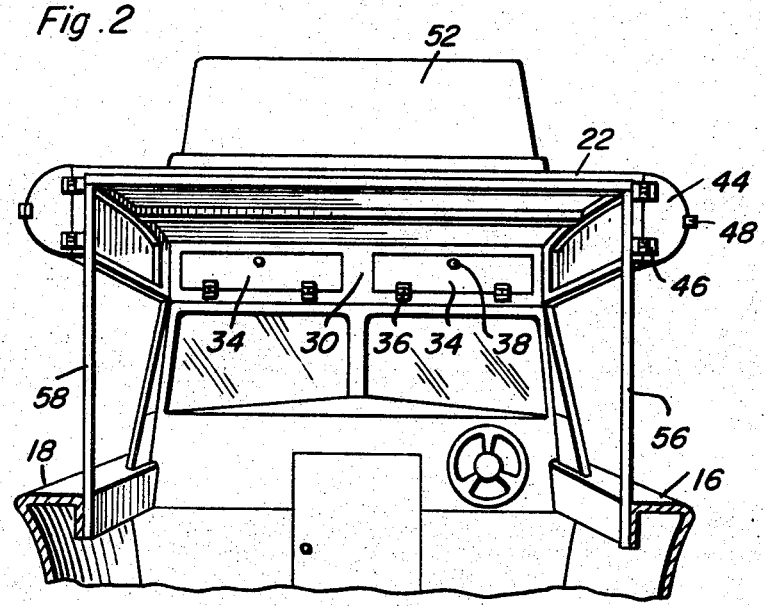
FIG. 2 is a fragmentary rear perspective view of the assemblage of FIG. 1 as seen from immediately aft of the hardtop cover.
Figure 3:
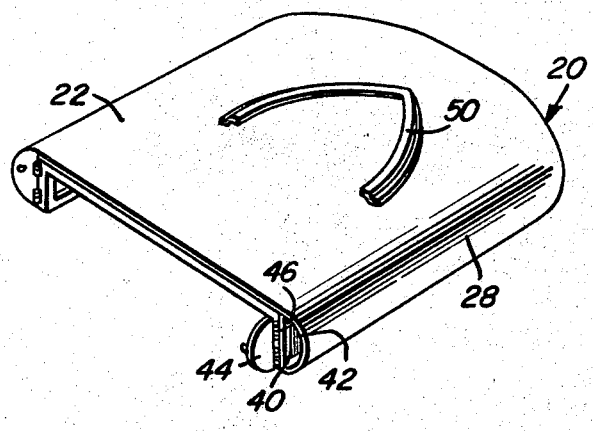
FIG. 3 is a perspective view of the hardtop cover illustrated in FIGS. 1 and 2.

The cover 20 includes a generally horizontal upper wall 22 including a forward extension 24 terminating forwardly in a downwardly curving and rearwardly and downwardly inclined partial underwall 26. The opposite side marginal edge portions of the upper wall 22 include downwardly and inwardly curving generally semi-cylindrical sidewall portions 28 which open horizontally inwardly toward each other and a transverse partition 30, see FIG. 2, is secured between the rear marginal edge portion of the underwall 26 and the portions of the upper wall 22 disposed thereabove. The partition 30 has a pair of opposite side access openings 32 formed therein and a pair of vertically swingable doors 34 supported therefrom by means of hinges 36 for opening and closing the openings 32. Each of the doors 34 is provided with suitable catch means for retaining the doors in the closed positions illustrated in FIG. 2 of the drawings and pull knobs 38 whereby the doors may be swung to their open positions.

The cover 20 further includes opposite side partitions 40 extending between the upper and lower marginal edges of the horizontally disposed, inwardly opening and generally semicylindrical sidewall portions 28 thereby defining a pair of opposite side storage compartments 42 between the partitions 40 and the sidewall portions 28. The rear ends of the compartments 42 are closed by means of horizontally swingable doors 44 hingedly supported from the rear ends of the partitions 40 by means of hinges 46 and the doors 44 are provided with suitable latches 48 for retaining the doors 44 in the closed position illustrated in FIG. 2 of the drawings.

The upper wall 22 of the cover 20 includes a bow-shaped dinghy gunwale retaining flange structure 50 whereby the gunwale of an inverted dinghy, such as the dinghy 52, may be supported in stationary position from the upper wall 22, suitable anchor means (not shown) may also be provided for preventing rearward shifting of the dinghy 52 relative to the top wall 22 after the gunwale of the bow portion of the dinghy 52 is engaged beneath the retaining flange assembly 50.

As may be seen from FIGS. 1, 2 and 4 of the drawings, the cover 20 is supported in generally horizontal position over the cockpit of the boat 10 disposed rearward of the windshield assembly 12 with the rear marginal edge portion of the underwall portion 26 resting and supported from the upper marginal edge portion 14 of the windshield assembly 12. The opposite side rear corners of the cover 20 are supported from the sides 16 and 18 of the boat 10 by means of suitable standards 56 and 58 and, therefore, it may be seen that the cover 20 is rigidly supported in elevated position above at least the forward area of the cockpit of the boat 10. Of course, a forward storage compartment 60 is defined forward of the partition 34 and between the underwall portion 26 and the extension 24 of the upper wall 22. This storage compartment 60, in conjunction with the storage compartments 42, define ample storage. The storage compartments 42 may be utilized for storing elongated members, such as fishing rods, boat hooks, and other equipment and the forward storage compartment 60 may be utilized for storing binoculars, charts, and other boating equipment to which immediate access may be desired by the operator of the boat 10.

With attention now invited more specifically to FIG. 6 of the drawings, there may be seen a modified form of boat cover referred to in general by the reference numeral 20' and which is substantially identical to the cover 20 and therefore has its various components referred to by prime reference numerals corresponding to the reference numerals designating the various parts of the preferred cover 20.

The cover 20' distinguishes from the cover 20 in that it includes port and starboard halves A and B provided with edge overlapping marginal portions 22A and 22B. In addition, corresponding marginal edge portions of the retaining flange assembly include overlapping portions 50A and 50B. It may, therebore, be seen that the amount of overlap of the various overlapped portions of the cover 20' may be adjusted in order to vary the width of the cover 20' so that it may be adapted for support from runabout boats of various widths. Otherwise, the cover 20' is substantially identical to the cover 20.

With reference now more specifically to FIG. 7 of the drawings, there may be seen a third form of cover referred to in general by the reference numeral 20" including an upper wall 22" and opposite sidewall portions 28" corresponding to the upper wall 22 and the sidewall portions 28. However, the sidewall portions 28" are only quarter cylindrical and terminate downwardly in horizontally directed bottom wall portions 29.

The cover 20" comprises the upper closure for a cabin structure referred to in general by the reference numeral 64 including opposite sidewalls 66 which extend upwardly from the opposite side decks 68 of the boat 10". The upper wall 22" extends between and is supported from the upper marginal edge portions of the sidewalls 66 and the latter have access openings 70 formed therein at points spaced longitudinally therealong which open into the opposite side compartments 72 defined between the upper marginal edges of the sidewalls 66 and the sidewall portions 28" above the bottom wall portions 29. The openings 70 include horizontally swingable doors 74 which may be swung to closed positions, such as that illustrated in FIG. 7 of the drawings and which are hingedly supported from the sidewalls 66 adjacent the marginal edge portions of the opening 70.

The cover 20" may or may not include a forward projection corresponding to the forward portion of the cover 20 for extension forwardly of the windshield portion (not shown) of the cabin structure 54.

With attention now invited more specifically to FIG. 8 of the drawings, there may be seen a modified form of cover referred to in general by the reference numeral 20''' including opposite sidewall portions 28'''' corresponding to the sidewall portions 28. The cover 20'''' is also utilized in conjunction with a cabin structure referred to in general by the reference numeral 76, but the cover 20''' more closely resembles the cover 20 in that it includes semi-cylindrical sidewall portions formed integrally with the upper wall 22'''. The cover 20''' is designed primarily for use in conjunction with a cockpit enclosing cabin but more as an upper cabin enclosure for an existing cabin side wall structure in which access openings corresponding to the openings 70 may be formed. On the other hand, if openings corresponding to the openings 70 are not desired, the opposite side portions of the rear end of the cover 22''' may be provided with doors corresponding to the doors 44.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a boat of the type including an upwardly projecting transversely extending windshield assembly and defining a cockpit area immediately rearward of said assembly, a cover structure for said cockpit area, said cover structure including a generally horizontal upper wall having front, rear and opposite side marginal edge portions, said front marginal edge portion including an integral forward extension directed downwardly and rearwardly at its forward extremity and terminating rearwardly beneath said front marginal edge portion, said extension defining a hollow rearwardly opening front storage compartment structure, said cover structure being supported from said boat in generally horizontal position with the rear lower marginal portion of said extension supported from and extending along the upper marginal edge portion of said windshield assembly, a major portion of said hollow front storage compartment structure projecting forwardly of the upper marginal edge portion of said windshield assembly and defining a sun shade for said windshield assembly, closure means shiftably supported from said cover structure for movement between open and closed positions relative to the rear portion of said storage compartment structure, said opposite side marginal edge portions including integral outward side extensions terminating outwardly in downwardly and inwardly directed portions whose inner extremities underlie said side marginal portions of said upper wall in vertically spaced relation relative thereto, said side extensions defining hollow opposite side storage compartment structures dependingly supported from opposite side marginal edge portions of said upper wall.

2. The combination of claim 1 wherein the opposite side storage structures open rearwardly through the rear ends thereof and include upstanding partitions closing the adjacent inner sides of said side storage compartment structures.

3. The combination of claim 1 wherein front storage compartment defining structure includes vertically swingable door means supported therefrom swingable into and out of positions closing the rearmost extremities of said rearwardly opening compartment.

4. The combination of claim 1 wherein said upper wall is of one-piece construction and substantially planar throughout a major portion of its horizontal extent.

5. The combination of claim 1 wherein said upper wall comprises a pair of opposite side upper wall sections including laterally offset and overlapped adjacent marginal edge portions secured together.

6. The combination of claim 1 wherein said upper wall includes upwardly projecting retaining flange means disposed along horizontal path defining a rearwardly opening recess approximating the plan shape of the bow of a dinghy, said retaining flange means terminating upwardly in inwardly directed flange portions beneath which the gunwale portions of the bow end of an inverted dinghy may be seatingly received.

* * * * *